Sept. 24, 1946. B. JORGENSEN 2,408,022
MACHINE FOR SHAPING UPPERS OVER LASTS
Filed Sept. 12, 1945 6 Sheets-Sheet 2

Inventor
Bernhardt Jorgensen
By his Attorney
Thomas Ryan

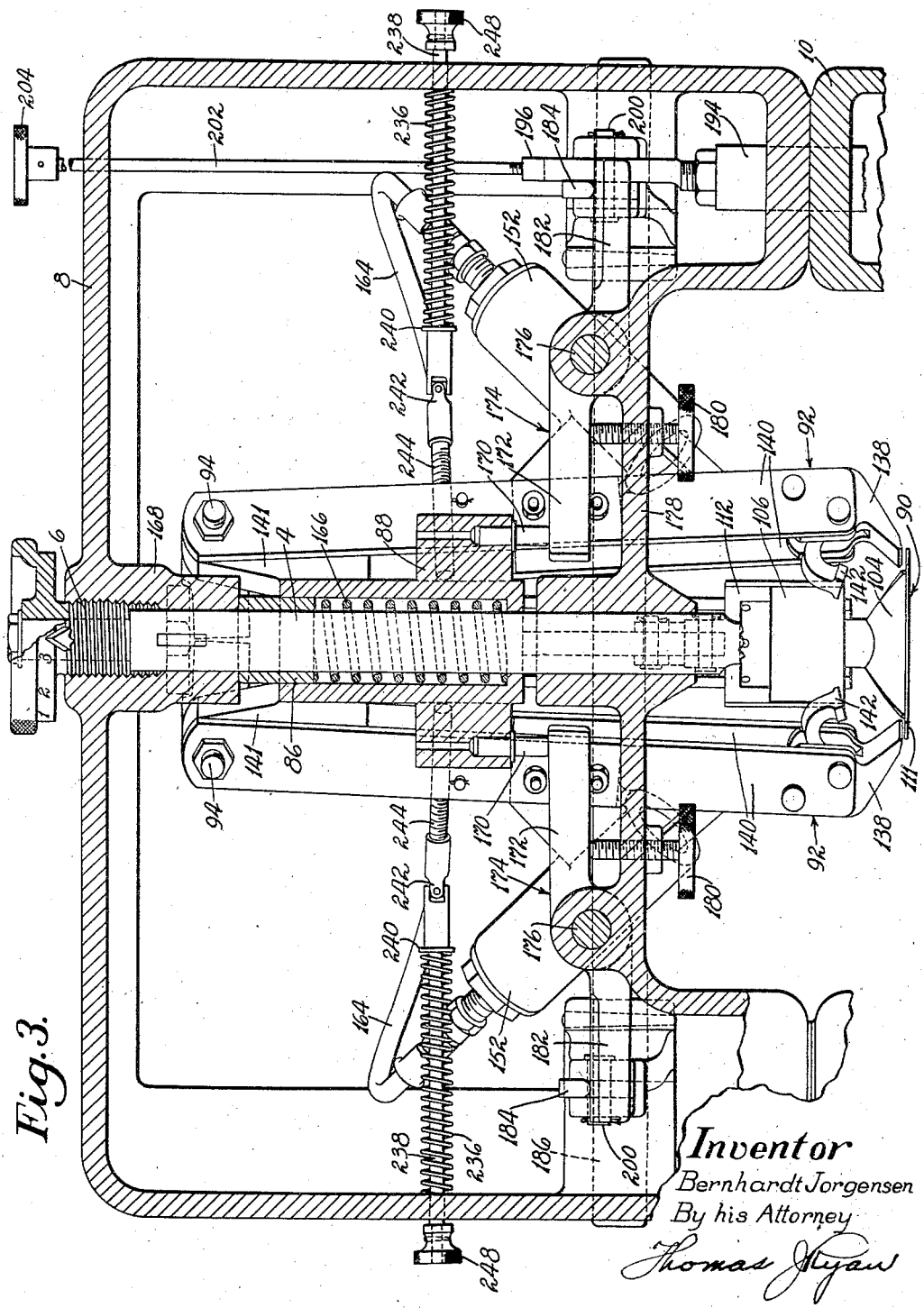

Sept. 24, 1946.  B. JORGENSEN  2,408,022
MACHINE FOR SHAPING UPPERS OVER LASTS
Filed Sept. 12, 1945   6 Sheets-Sheet 4
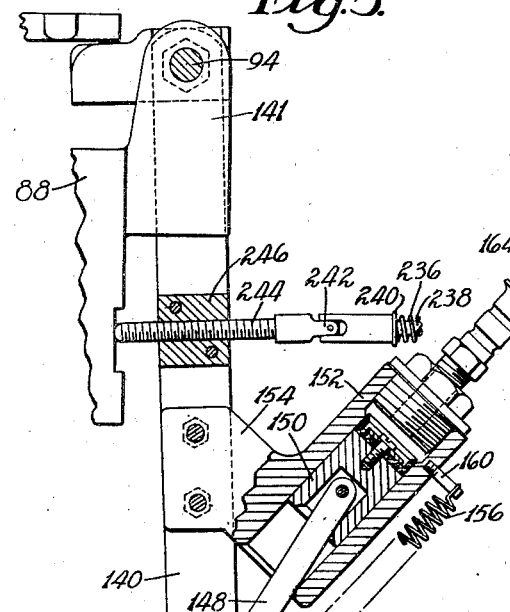
Fig. 5.
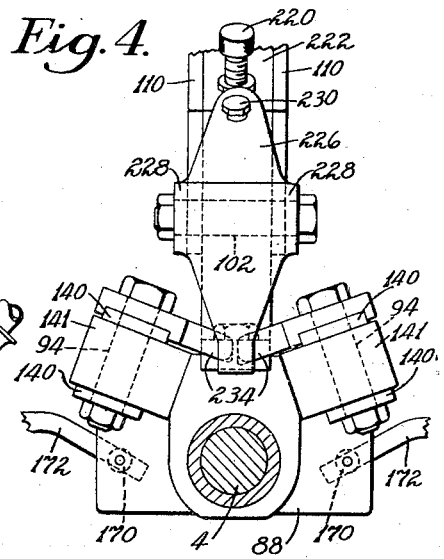
Fig. 4.
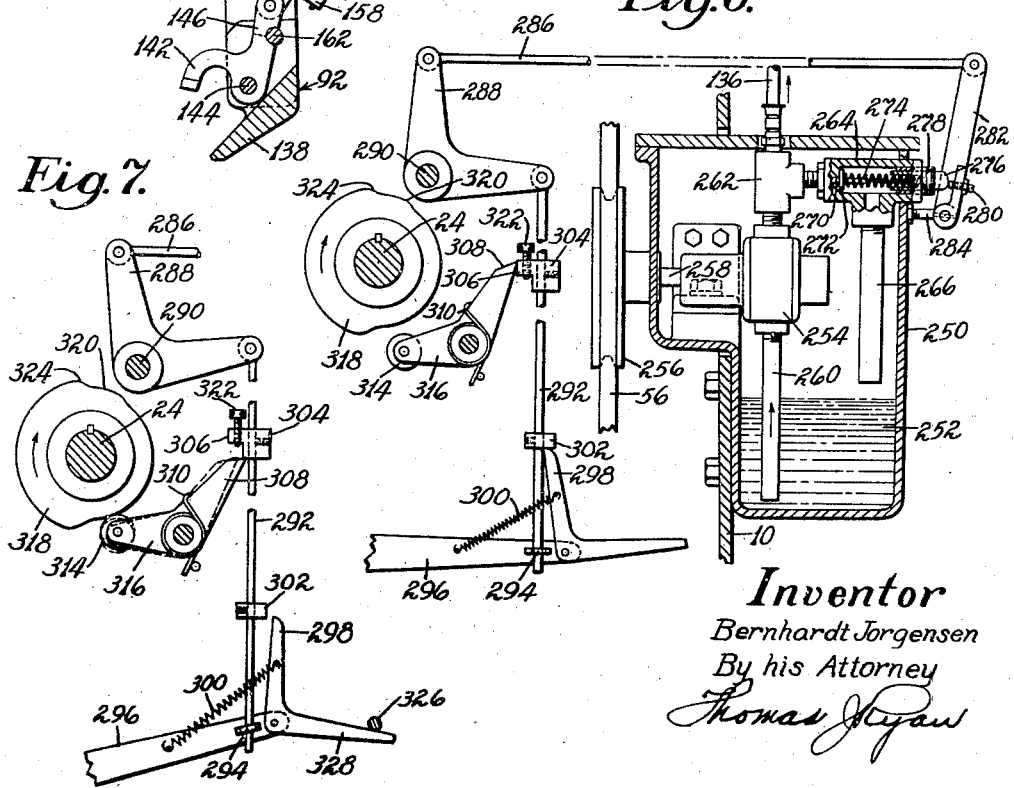
Fig. 6.
Fig. 7.
Inventor
Bernhardt Jorgensen
By his Attorney
Thomas Ryan Sept. 24, 1946.                 B. JORGENSEN                    2,408,022
                     MACHINE FOR SHAPING UPPERS OVER LASTS
                        Filed Sept. 12, 1945          6 Sheets-Sheet 5

*Inventor*
Bernhardt Jorgensen
By his Attorney
Thomas J. Ryan

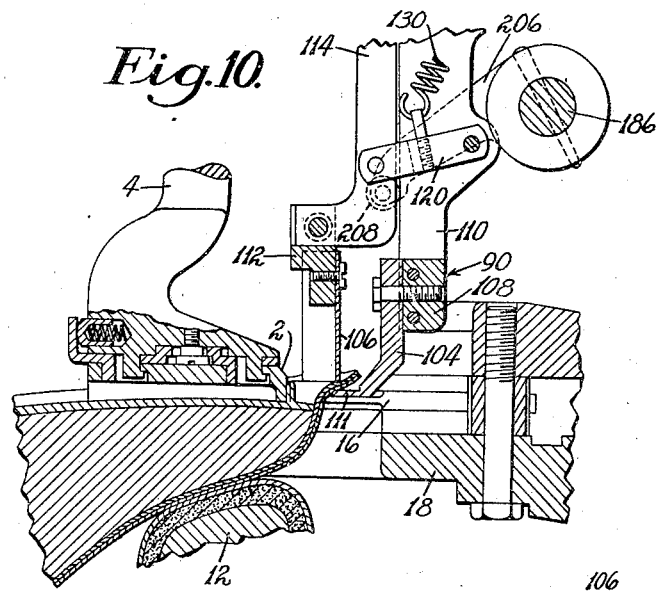
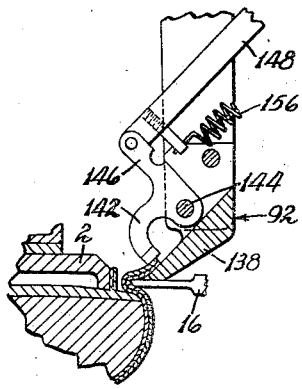
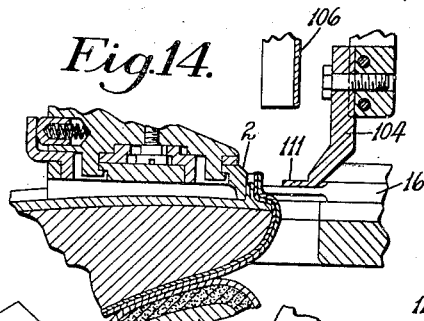
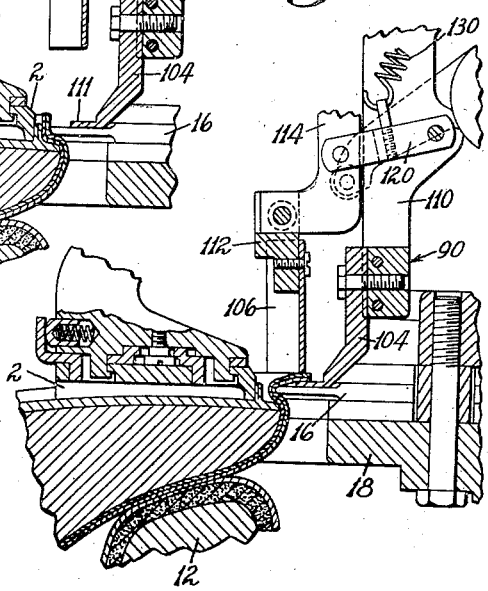
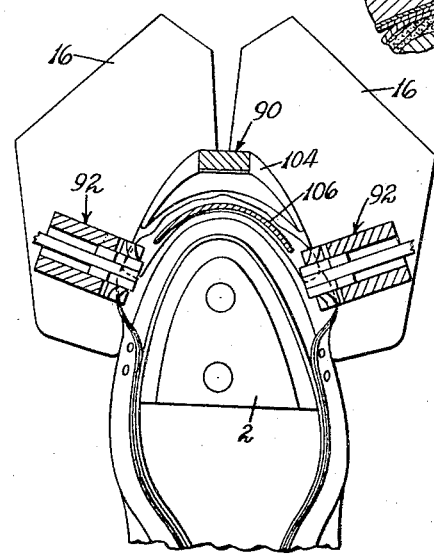

Patented Sept. 24, 1946

2,408,022

UNITED STATES PATENT OFFICE 2,408,022

MACHINE FOR SHAPING UPPERS OVER LASTS

Bernhardt Jorgensen, Marblehead, Mass., assignor to United Shoe Machinery Corporation, Flemington, N. J., a corporation of New Jersey Application September 12, 1945, Serial No. 615,806

37 Claims. (Cl. 12—14)

This invention relates to machines for shaping uppers over lasts, and is herein illustrated as applied to a toe-lasting machine which, except as hereinafter noted, is constructed substantially as disclosed in United States Letters Patent No. 2,160,846, granted on June 6, 1939, on an application of F. C. Eastman's and A. F. Pym's. It is to be understood, however, that in various novel aspects the invention is not limited to the illustrative embodiment.

The machine shown in the above-mentioned Letters Patent is provided with grippers which grip the marginal portion of an upper about the toe end of a last and apply a pull to the upper in the course of a cycle of automatic operations of the machine, and with wipers which, after wiping the toe end of the upper heightwise of the last, wipe its marginal portion inwardly over an insole on the last also in the course of the cycle of operations. An object of this invention, in general, is to provide improved means for pulling the upper and thereby to improve the results obtained in the lasting operation. In order that the force of the pull applied to the upper may be readily determined and controlled, the machine herein shown has toe grippers, comprising an end gripper and side grippers, which are closed on the upper by fluid-pressure means and are so formed as to slip more or less on the upper in the upper-pulling operation, so that the force of their pull on the upper depends upon the pressure of the operating fluid whereby they are closed. Simple and conveniently controllable means provided by the invention for determining this pressure and for causing the closure of the grippers comprises a relief valve arranged to be opened by the fluid delivered by a pump and offering initially such little resistance to escape of the fluid as to prevent the development of sufficient pressure to close the grippers, together with means for increasing the resistance of this valve to escape of the fluid and for thereby causing the grippers to close. In the construction shown the valve is controlled by a spring through compression of which the resistance of the valve to the escape of the fluid is thus increased and which by adjustment variably determines the force with which the upper is gripped in the upper-pulling operation. As further herein illustrated, the spring is controlled by a treadle by depression of which the grippers are caused to close as above described prior to the starting of the cycle of operations of the machine and by optional release of which the grippers may be caused to open to permit the upper to be better positioned between their jaws. Further depression of the treadle beyond the position where it causes the grippers to close serves to start the cycle of operations of the machine and to actuate means for maintaining the compression of the valve spring regardless of the treadle.

In addition to novel features involved in the construction above outlined, the invention further provides novel means for changing at a predetermined time in the operation of the machine the force with which the grippers grip the upper. In the illustrative embodiment of the invention the force of the grip on the upper is thus reduced by automatic control of the above-mentioned valve spring substantially at the time when the wipers begin their movements to wipe the marginal portion of the upper inwardly over the insole, thus permitting the upper to slip more freely in the gripper jaws to avoid excessive strain thereon. Thereafter, by further automatic control of the spring, the grippers are caused to open and release the upper.

The above and other features of the invention, including various novel details of construction and combinations of parts, will now be more particularly described with reference to the accompanying drawings and thereafter pointed out in the claims.

In the drawings:

Fig. 3 is a view partly in front elevation and partly in section of most of the structure shown in Fig. 2;

Fig. 4 is mainly a plan view of parts shown near the top of Fig. 2;

Fig. 5 is a view partly in elevation and partly in section of one of the side grippers and the gripper-closing mechanism associated therewith;

Fig. 6 is a view partly in right-hand side elevation and partly in section, showing the means for supplying fluid under pressure to close the grippers and the means for controlling the closing and opening thereof, the parts being shown in their initial positions;

Fig. 7 shows a portion of the controlling mechanism shown in Fig. 6, with the parts as they appear at the start of the cycle of operations of the machine;

Fig. 10 is a view similar to Fig. 8, with the parts as they appear when the wipers are about to begin the wiping of the upper inwardly over the insole;

Fig. 11 is a plan view showing the grippers and the wipers in the same relation to the shoe as in Fig. 10;

Fig. 12 is a view similar to Fig. 10, showing the parts as they appear when the grippers are about to release the upper;

Fig. 13 illustrates the relation of one of the side grippers to the shoe and the wipers at the same time in the operation of the machine as in Fig. 12; and Fig. 14 is a view similar to Fig. 12, with the parts as they appear when the wipers have completed their inward wiping movements.

Figure 1:
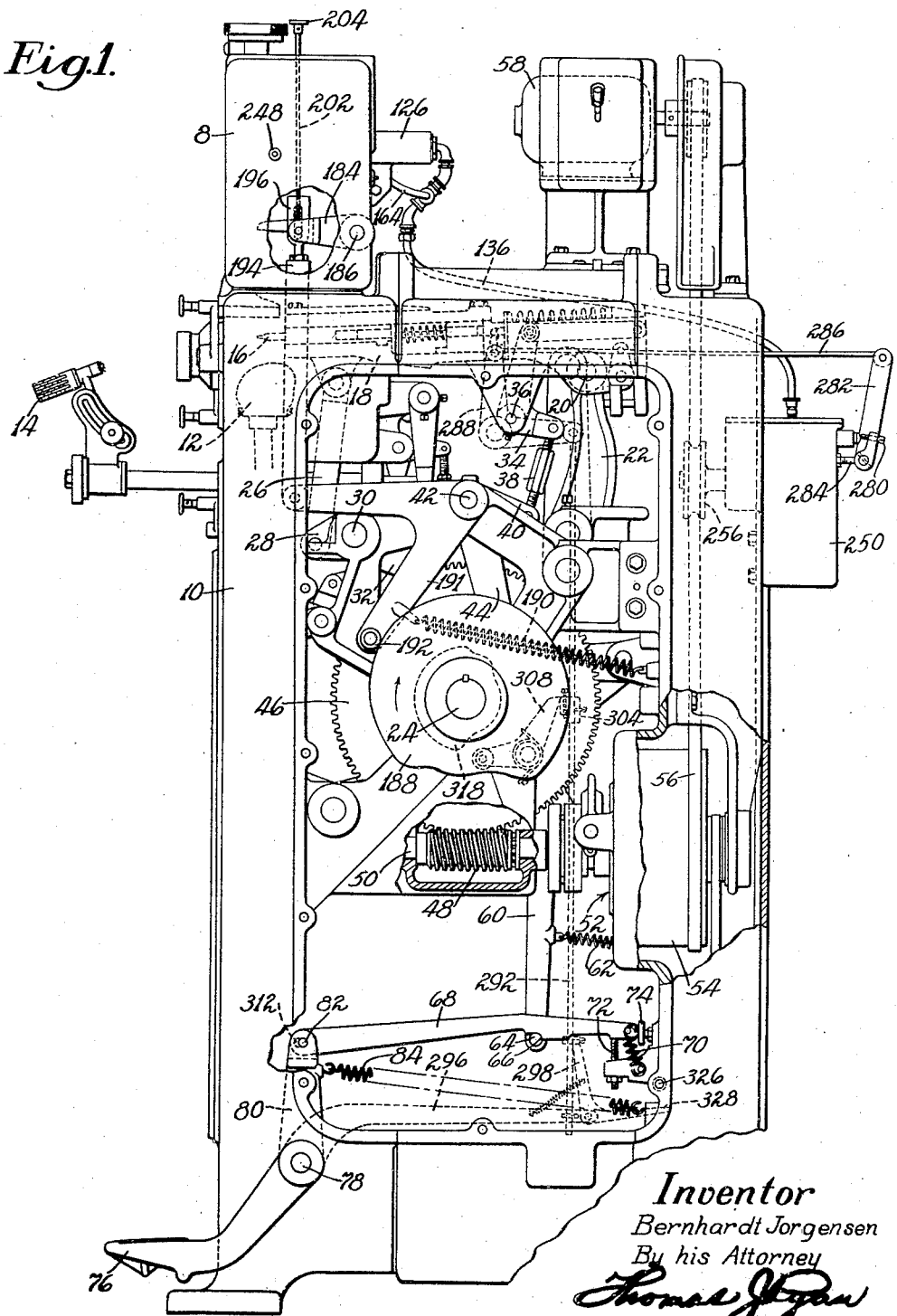
Fig. 1 is a view in right-hand side elevation of the machine in which the invention is herein shown as embodied, with parts broken away.

In view of the disclosure in the previously mentioned Letters Patent, such parts of the machine herein shown as are common to that disclosure will be described only in so far as is necessary for an understanding of the present invention. For positioning the shoe in proper relation to the lasting instrumentalities the machine is provided with a member 2 detachably supported on the lower end of a rod or post 4 which is vertically adjustable by means of a sleeve 6 threaded in a top frame casting 8 secured on the main frame 10 of the machine. The member 2 engages the bottom face of the toe end of the insole and, for positioning a shoe of the welt type, engages also the inner face of the lip of the insole around the end and along the sides of the toe. Substantially at the beginning of the cycle of operations of the machine the shoe is clamped against the member 2 by upward movement of a toe rest 12, and early in the cycle of operations also a heel rest 14 (Fig. 1) is moved rearwardly into engagement with the heel end of the shoe to assist in holding it during the lasting operation.

As part of the lasting means, the machine is further provided with a pair of wipers 16 which are advanced lengthwise of the shoe and are closed inward laterally of the shoe to embrace the upper about the toe end of the last and are swung upwardly to wipe the upper heightwise of the last, after which they are further advanced and closed to wipe the marginal portion of the upper inwardly over the feather and against the lip of the insole, the lip being supported against the inward pressure of the wipers by the member 2. The wipers are supported on a wiper carrier 18 mounted at its rear end for swinging movements heightwise of the shoe on a rod 20 (Fig. 1) supported on the upper end of a lever 22 which is operated to advance the wiper carrier and the wipers lengthwise of the shoe by a cam (not shown) on a cam shaft 24. The front end portion of the wiper carrier is connected by a pair of downwardly extending links 26 to a pair of arms 28 fast on a rockshaft 30 on which is also secured an arm 32 operated by another cam (not shown) on the cam shaft 24. By this means the wiper carrier and the wipers are swung upwardly about the axis of the rod 20 to wipe the upper heightwise of the last and are later swung downwardly to press the upper on the feather of the insole. The wipers are closed inward laterally of the shoe in proper time relation to their other movements by wiper-closing mechanism supported on the wiper carrier and operated through a bell-crank lever 34 pivotally mounted at 36 on the carrier and connected by a link 38 to an arm 40 fast on a rockshaft 42 on which is also secured an arm 44 operated by a cam on the cam shaft 24, as more fully disclosed in the previously mentioned Letters Patent.

The cycle of operations of the machine corresponds to one complete revolution of the cam shaft 24. This cam shaft carries a worm gear 46 driven by a worm 48 on a shaft 50 which is operated intermittently through a friction clutch 52, one element of this clutch consisting of a drum or pulley 54 driven continuously through a belt 56 by an electric motor 58. The clutch is actuated or tripped to start the machine by forward swinging movement of an arm 60 against the resistance of a spring 62. At its lower end this arm is provided with a pin 64 normally engaged by a shoulder 66 formed on a forwardly and rearwardly extending bar 68 the rear end of which is held by a spring 70 on a supporting screw 72 and is engaged by a stop 74 on the frame to limit its rearward movement. The forward swinging movement of the arm 60 is accordingly effected by engagement of the shoulder 66 on the bar 68 with the pin 64 in response to forward movement of the bar. The bar 68 is thus operated by a treadle 76 fast on a rockshaft 78 on which is also secured an upwardly extending arm 80 connected to the bar by a pin 82 and swung rearwardly by a spring 84 when the treadle is released. As disclosed in the previously mentioned Letters Patent, the clutch-tripping arm 60 is further controlled by cam-operated mechanism (not herein fully shown) whereby it is moved downwardly to disengage the pin 64 from the shoulder 66 and thus to permit the arm to be swung rearwardly by the spring 62 in case the operator continues to hold the treadle depressed, and whereby also the arm 60 is thereafter moved upwardly to disengage the clutch and bring the machine to a stop at a time determined by the cam which controls it. It may be assumed that, in accordance with the disclosure of the above-mentioned Letters Patent, the machine thus comes to a stop twice prior to the end of the cycle, first to permit the operator to attach a binder wire to one side of the shoe and to draw it part way inwardly under the wipers around the toe, and again to permit him to fasten the wire at the other side of the shoe after the wipers have been partially retracted and opened and again advanced and closed to force the wire firmly against the upper. It will be understood that after each of such stops in the cycle of operations the operator again starts the machine in the same manner as initially by depression of the treadle.

As thus far described the machine herein shown may be assumed to be of substantially the same construction as disclosed in the above-mentioned Letters Patent. For purposes of this invention it is provided with means different from that prior disclosure for gripping the margin of the toe end of the upper and for applying a pull to the upper to assist the wipers in the lasting of the toe. Guided for upward and downward movements by the post 4 and by a sleeve 86 (Figs. 3 and 8) on the post is a block 88 which serves as a support for an end gripper 90 arranged to grip the marginal portion of the upper about the end of the toe and for a pair of side grippers 92 arranged to grip it respectively at the opposite sides of the toe. The two side grippers are supported directly by the block 88 and are mounted on studs 94 on this block to swing laterally of the shoe in directions oblique to the longitudinal median line of the forepart of the shoe, as is evident from Figs. 4 and 11. The end gripper 90 is supported directly by another block 96 which is adjustable vertically along a guideway 98 in the block 88 and is secured in adjusted position by a screw 100. The end gripper is, therefore, adjustable heightwise of the shoe relatively to the side grippers, and it is further mounted to swing in directions lengthwise of the shoe about a stud 102 on the block 96.

Figure 2:
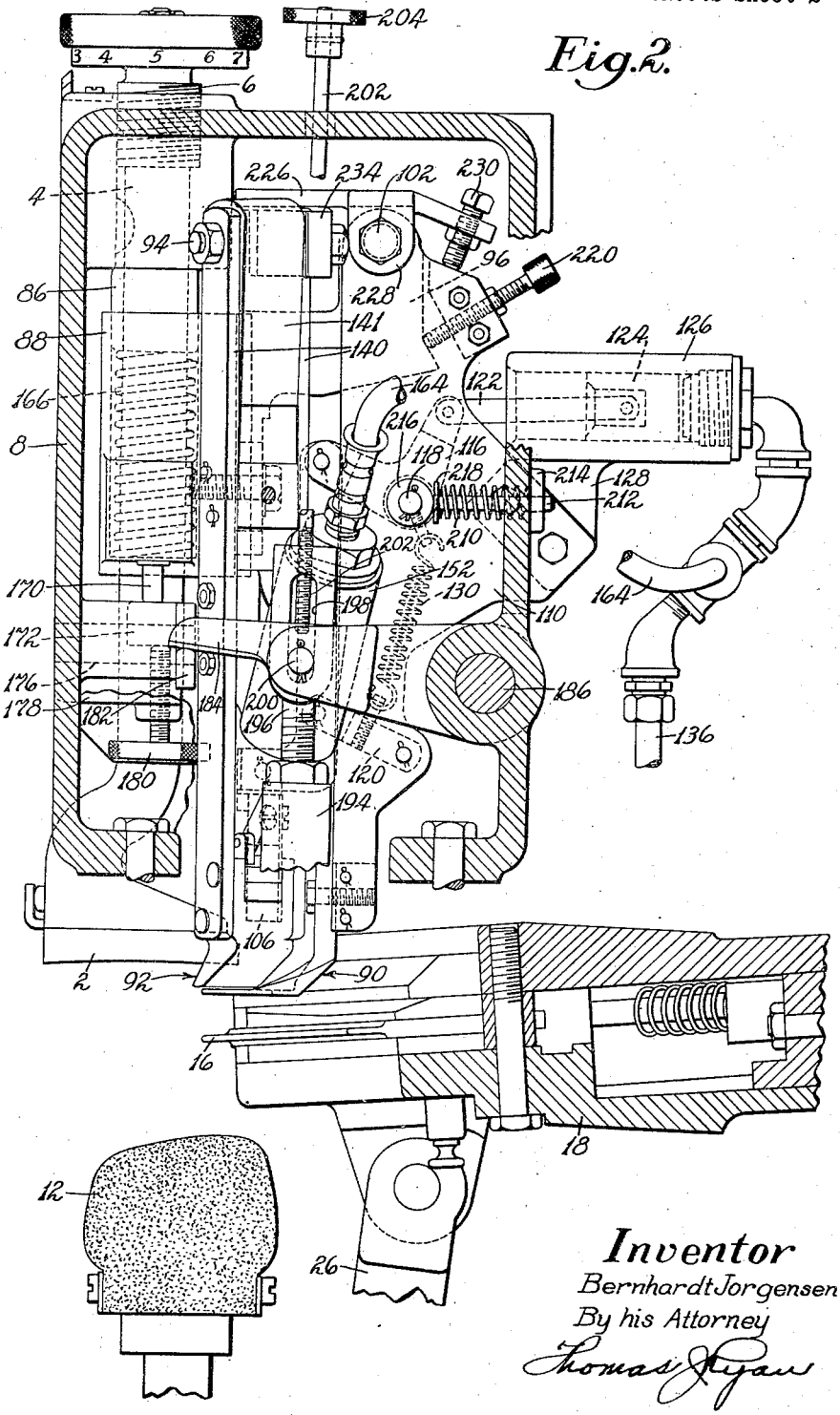
Fig. 2 is a view partly in right-hand side elevation and partly in section, on an enlarged scale, of the upper front portion of the machine.
Figure 8:
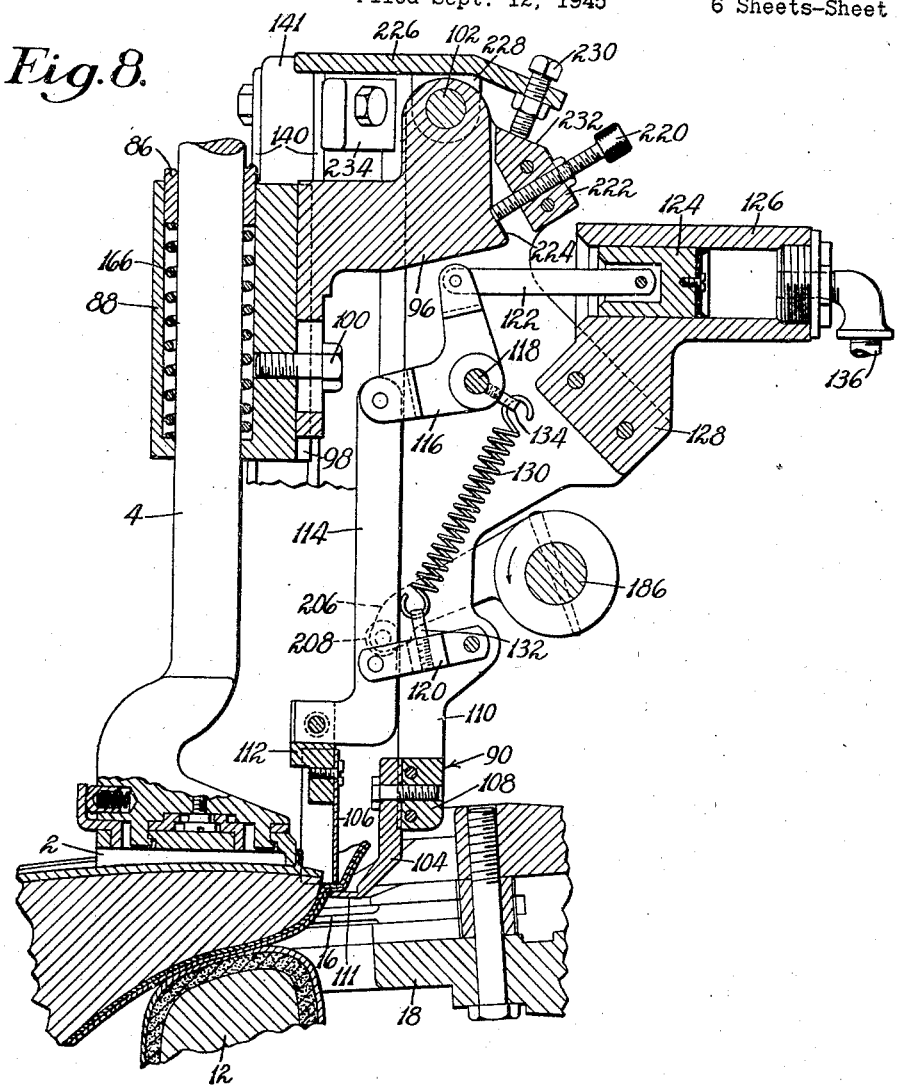
Fig. 8 is a central vertical section from front to rear, showing the end gripper and the wipers as they appear at the time in the operation of the machine when the wipers are about to begin the wiping of the upper heightwise of the last.

The end gripper 90 includes a pair of upper-gripping jaws 104 and 106, the jaw 104 being fastened to a small block 108 which is secured between the lower ends of two spaced upwardly extending plates 110 pivotally mounted at their upper ends on the stud 102 at opposite sides of the block 96. The jaw 104 is provided with a substantially horizontal upper-gripping portion 111 the edge of which is curved about the toe end of the shoe and on which the upper is clamped by the lower edge of the jaw 106, this jaw consisting of a comparatively thin, substantially vertical plate curved about the toe end of the shoe similarly to the edge of the upper-gripping portion of the jaw 104. The upper end portion of the jaw 106 is fastened to a small block 112 which is secured to a forwardly extending lower end portion of a bar 114 pivotally connected at its upper end to one arm of a bell-crank lever 116 mounted between the two plates 110 to swing about a pin 118. The bar 114 is further controlled by a link 120 also mounted between the plates 110 and pivotally connected at its opposite ends respectively to the plates and to the bar. The other arm of the bell-crank lever 116 is connected by a link 122 to a piston 124 movable in a cylinder 126 having a downwardly extending portion 128 secured between the two plates 110. A spring 130 connected to a pin 132 on the link 120 and to a pin 134 on the hub of the bell-crank lever 116 tends to raise the bar 114 and the gripper jaw 106 and holds the jaw initially in a raised or open position in which it is shown in Figs. 2 and 3 with the piston 124 at the inner end of the cylinder 126. It will be understood that the jaw 106 is moved downwardly to clamp or grip the upper against the cooperating jaw 104, as shown in Fig. 8, by operating fluid admitted to the cylinder 126. The operating fluid, preferably light oil, is admitted to the cylinder 126 at the proper time, as more particularly hereinafter described, through a conduit 136 leading from the source of fluid supply, a portion of this conduit being flexible to permit the required movements of the gripper in the pulling of the upper.

Each of the side grippers 92 includes a jaw 138 (Fig. 5) secured between the lower ends of a pair of upwardly extending plates 140 the upper ends of which are mounted on the corresponding stud 94 at opposite sides of a lug 141 extending from the block 88. The jaw 138 has an outwardly and upwardly inclined upper-engaging face, in view of the more upstanding position of the portion of the margin of the upper engaged by each side gripper as compared with the portion engaged by the end gripper 90. Arranged to cooperate with the jaw 138 to grip the upper is a jaw 142 pivotally mounted on a pin 144 to swing into upper-gripping position with a component of outward movement with respect to the edge of the shoe bottom. A tail portion 146 of the jaw 142 is connected by a link 148 to a piston 150 mounted in a cylinder 152 having an extension 154 secured between the two plates 140. A spring 156 connected to a pin 158 on the link 148 and to a pin 160 on the cylinder 152 holds the jaw 142 initially in open position determined by engagement of its tail portion 146 with a pin 162. Closing or upper-gripping movement is imparted to the jaw 142 by fluid admitted to the cylinder 152 through a flexible conduit 164 communicating with the conduit 136 leading to the cylinder 126 associated with the end gripper.

Upper-pulling movements heightwise of the last are imparted to the end gripper and the side grippers after they have closed on the upper by upward movement of the block 88 against the resistance of a spring 166 confined between a shoulder on the block and the sleeve 86, the sleeve abutting at its upper end against a boss 168 (Fig. 3) extending downwardly from the frame casting 8 and serving as a guide for the upper end portion of the adjustable post 4. Secured in the block 88 and extending downwardly therefrom are two pins 170 which rest at their lower ends on inwardly extending arms 172 of levers 174 pivotally mounted between their ends on pins 176 supported in a web 178 extending inwardly from the front of the frame casting 8. The arms 172 are engaged underneath by screws 180 which are threaded in the web 178 and thereby serve to support the block 88 and the grippers initially at an adjustably variable height. The levers 174 are further provided with outwardly extending arms 182 the outer end portions of which are engaged above by arms 184 (Figs. 2 and 3) which are fast on a rockshaft 186 mounted in bearings in the frame casting 8. It will thus be seen that upward movement of the block 88 and the grippers is effected by downward swinging movements of the two arms 184. These arms are thus operated, under control of a cam 188 (Fig. 1) on the cam shaft 24, by a spring 190 connected to a bell-crank lever 191 which is mounted to swing about the previously mentioned shaft 42 and one arm of which carries a roll 192 in engagement with the cam. The other arm of the bell-crank lever is connected to an upwardly extending link 194 secured to the upper end of which is a member 196 (Fig. 2) provided with a slot 198 through which extends a pin 200 carried by one of the arms 184. Threaded in the upper end of the member 196 is a rod 202 which extends downwardly into the slot 198 and also extends upwardly through an opening in the top of the frame casting 8, the rod having on its upper end a knob 204 for turning it to vary the distance between the lower end of the rod and the pin 200. When the cam 188 arrives in position to permit the bell-crank lever 191 to be swung downwardly by the spring 190 downward movement is imparted to the link 194 and the member 196 to carry the screw 202 into engagement with the pin 200, after which further downward movement of these parts serves to swing the arms 184 downwardly and thus to operate the grippers to pull the upper heightwise of the last.

In the course of the above-described upper-pulling movements of the grippers heightwise of the last they also receive short movements which may be termed upper-spreading movements, the end gripper swinging outwardly about the stud 102 and the side grippers about the studs 94. For thus operating the end gripper there is fast on the rockshaft 186 an arm 206 (Fig. 8) provided with a roll 208 arranged to engage the inner edge of one of the plates 110 of the end gripper. It will be understood that in the upper-pulling operation the arm 206 is swung downwardly, thus causing the roll 208 to impart the outward swinging movement to the gripper. The swinging movement of the end gripper is effected against the resistance of a return spring 210 (Fig. 2) which surrounds a rod 212 extending rearwardly through a bar 214 fast on the frame casting 8 and provided at its front end with an eye 216 mounted on the pin 118. The spring 210 bears at its rear end against the bar 214 and at its front end against a washer 218 in engagement with the eye 216. Arranged to cooperate with the spring 210 to determine adjustably the initial position of the end gripper with respect to movement about the stud 102 is a screw 220 (Fig. 8) which is threaded in a block 222 secured between the two plates 110 of the gripper and bears at its inner end against a shoulder 224 on the block 96. The outward swinging or upper-spreading movements are imparted to the side grippers by the swinging movement of the end gripper. For this purpose there is provided a lever 226 having downwardly extending lugs 228 (Figs. 2, 4 and 8) which are mounted on the stud 102. In the rear end of the lever 226 is threaded a screw 230 the lower end of which is arranged to be engaged by a shoulder 232 on the block 222 to swing the lever about the stud 102 by the swinging of the end gripper. For imparting the swinging movements to the side grippers the front end portion of the lever 226 is arranged to engage the inner ends of two arms 234 each of which interlocks with one of the plates 140 of the corresponding side gripper and is held in fixed relation to the gripper by a head on the stud 94. The outward swinging movement of each side gripper is effected against the resistance of a return spring 236 (Figs. 3 and 5) which surrounds a rod 238 extending outwardly through an opening in the frame casting 8. The spring abuts at one end against this casting and at the other end against a washer 240 which is seated on an enlarged inner end portion of the rod. The rod is connected by a universal joint 242 to another rod 244 which is threaded in a block 246 secured between the two side plates 140 of the gripper and bears at its inner end against the gripper-supporting block 88. It will be evident that by turning the rod 244 the initial position of the side gripper with respect to swinging movement about the stud 94 may be varied, the spring 236 holding the rod normally against the block 88. The rod 244 is thus turned to adjust the gripper by turning movement of the rod 238 effected by the use of a knob 248 on its outer end.

The jaws of the several grippers have smooth upper-engaging faces to permit them to slip on the upper when the force of the pull thereon becomes great enough, thus insuring against any danger of distorting or damaging the upper materials. The force of the pull applied by the grippers to the upper, therefore, depends upon the force with which they grip the upper, and this is determined by the pressure of the fluid in the gripper-closing cylinders 126 and 152. Fluid is supplied to these cylinders from a reservoir 250 (Figs. 1 and 6) secured to the rear of the frame 10 and having therein a body of fluid 252 under atmospheric pressure. Mounted in the reservoir is a rotary pump 254 driven by engagement of the belt 56 with a pulley 256 fast on the shaft 258 of the pump. The pump receives fluid through a pipe 260 and delivers it to a coupling 262 from which the previously mentioned conduit 136 leads toward the gripper-closing cylinders. Normally, however, the fluid delivered by the pump returns to the reservoir 250 through a by-pass including a valve casing 264 and a pipe 266 without developing any substantial pressure, i. e., pressure sufficient to overcome the force of the gripper-opening springs 130 and 156. The valve casing 264 is provided with a port 270 in communication with the coupling 262, and controlling the port 270 is a valve 272 arranged to be opened by the fluid but to be pressed toward its seat by a spring 274. The outer end of this spring is seated in a recess formed in a plunger 276 which is slidingly movable in a sleeve 278 threaded in the wall of the reservoir 250 and is engaged on its outer end by a screw 280 carried by an arm 282 pivotally mounted on a supporting member 284 on the reservoir. The arm 282 is connected by a link 286 to one arm of a bell-crank lever 288 mounted on a rod 290 on the frame of the machine, and extending downwardly from the other arm of this bell-crank lever is a rod 292 the lower end of which extends through an eye bolt 294 rotatably mounted on an arm 296 which is fast on the treadle-operated rockshaft 78. Pivotally mounted on the rear end of this arm is a latch 298 held normally by a spring 300 under a collar 302 fast on the rod 292. It will thus be seen that when the treadle 76 is in its initial position, determined by the engagement of the rear end of the bar 68 with the stop 74 under the influence of the spring 84, the rear end of the arm 296 is in its lowest position, and at this time but little, if any, force is exerted on the valve-controlling spring 274 by the plunger 276. Under these conditions the fluid is delivered by the pump past the valve 272 without developing sufficient pressure to close the grippers on the upper. In response, however, to depression of the treadle after a shoe has been presented to the machine the rod 292 is lifted by the arm 296 and the latch 298, thus causing the arm 282 to force the plunger 276 inwardly and to compress the spring 274. The pressure thus applied to the valve 272, tending to obstruct the flow of the fluid through the port 270, causes such an increase in the pressure of the fluid delivered by the pump as to close the grippers on the upper.

Fast on the rod 292 is a block 304 having a front vertical face 306 engaged initially by the upper end of a latch 308 pivotally mounted on the frame and controlled by a spring 310. Initially, to cause the closure of the grippers, the operator depresses the treadle only as far as determined by a slot 312 (Fig. 1) which is formed in the front end of the bar 68 and through which the pin 82 carried by the arm 80 extends. The increased resistance to further movement of the treadle when the pin 82 reaches the front end of this slot is perceptible to the operator and assists him in stopping the movement of the treadle at that point. This initial movement of the treadle does not move the block 304 far enough upwardly to carry its vertical front face 306 beyond the latch 308. If, therefore, the operator should observe that the margin of the upper is not properly engaged by the grippers, he may cause the grippers to open and release the upper merely by permitting the treadle to return to its initial position. This affords the opportunity to rearrange the margin of the upper in the grippers prior to the starting of the cycle of operations of the machine. After the upper has been properly gripped the treadle is further depressed to trip the clutch and start the cycle of operations. In response to such further movement of the treadle the rod 292 is moved farther upwardly to increase the compression of the spring 274 and thus to increase the force with which the grippers grip the upper by further increasing the pressure of the operating fluid. In this operation the block 304 is moved far enough upwardly to cause the latch 308 to be swung by the spring 310 to a position under the lower face of the block, as illustrated in Fig. 7, so that the spring 274 will be held under the increased compression by the latch. It will be evident that the force with which the upper is gripped in the upper-pulling operation of the grippers may be varied by adjustment of the screw 280 to vary the compression of the spring 274 controlling the valve 272 which serves as a relief valve.

When the latch 308 is swung into position under the block 304 as above described, a roll 314 mounted on a tail portion 316 of the latch is carried into engagement with a cam 318 on the cam shaft 24, as shown in Fig. 7. Substantially at the time in the cycle of operations when the wipers 16 begin their movements to wipe the marginal portion of the upper inwardly over the insole a rise 320 on the cam engages the roll 314 and swings the latch 308 out from under the lower face of the block 304 to the position indicated by dotted lines in Fig. 7, thus permitting the rod 292 to move downwardly until a screw 322 carried by the block engages the upper end of the latch. In this manner the pressure of the grippers on the upper is reduced by reducing the pressure of the fluid whereby they are held closed. Thereafter, before the wipers have completed their inward wiping movements, a further rise 324 on the cam swings the latch out from under the screw 322 and permits the rod 292 to return to its initial position, thus causing the grippers to open and release the upper by reason of the further reduction of the pressure of the operating fluid. In order that the rod 292 may be permitted thus to move downwardly if the operator should continue to hold the treadle depressed, a pin 326 on the frame engages a tail portion 328 of the latch 298 and swings the latch out from under the collar 302 when the operator depresses the treadle far enough to trip the clutch, as illustrated in Fig. 7.

Figure 9:
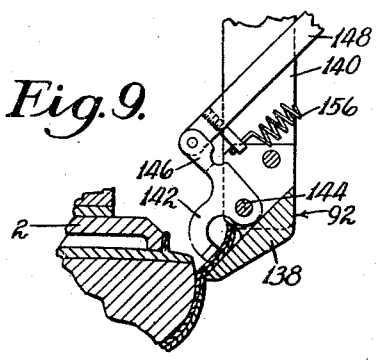
Fig. 9 shows one of the side grippers as it appears at the same time in the operation of the machine as in Fig. 8.

The manner of operation of the machine will now be briefly summarized. The operator presents the shoe in the position determined by the member 2 with the margin of the toe end of the upper extending between the open jaws of the several grippers, and while holding the shoe in that position he depresses the treadle 76 as far as permitted by the lost motion between the arm 80 and the bar 68 (Fig. 1). By this depression of the treadle the rod 292 (Fig. 6) is lifted by the latch 298 on the arm 296 to compress the spring 274 and thereby to cause the valve 272 to offer such resistance to the return of the fluid from the pump through the port 270 as to cause the pressure of the fluid between the valve and the pump to increase sufficiently to operate the pistons 124 and 150 and thus to close the grippers on the upper. The extent of this movement of the treadle is not enough to carry the face 306 on the block 304 upwardly beyond the latch 308, and, accordingly, if the operator observes that the margin of the upper has not been properly gripped he may cause the grippers to open and release the upper merely by releasing the treadle and thereby permitting the spring 274 to expand. In that event, after rearranging the margin of the upper in the grippers, he again depresses the treadle as before and if the upper is properly gripped he further depresses it to trip the clutch and start the cycle of operations. By such further depression of the treadle the valve-controlling spring 274 is further compressed to cause the grippers to grip the upper with greater force in the upper-pulling operation, and the block 304 is moved so far upwardly that the latch 308 is swung to a position under the lower face of the block, as shown in Fig. 7, the latch 298 being swung out from under the collar 302 by the pin 326 to permit the block and the rod 292 to be supported by the latch 308. The positions of the grippers when they thus grip the upper are as illustrated in Figs. 8 and 9.

Early in the cycle of operations, as more fully described in the previously mentioned Letters Patent, the toe rest 12 is moved upwardly to clamp the shoe against the member 2 and the heel rest 14 is moved into shoe-engaging position. When the cam 188 (Fig. 1) arrives in position to permit the bell-crank lever 191 to be operated by the spring 190 this movement of the bell-crank lever operates the rockshaft 186 and causes the arms 184 on the rockshaft to swing the levers 174 in the directions to raise the gripper-supporting block 88, thus causing the grippers to pull the upper heightwise of the last. At substantially the same time the arm 206 (Fig. 8) on the rockshaft swings the end gripper 90 a short distance in a rearward direction, and by this movement of the end gripper the side grippers 92 also are swung outwardly through the action of the lever 226 on the arms 234. The several grippers thus have an outward spreading action on the margin of the upper. The grippers may slip more or less on the upper when the force of their pull thereon becomes great enough, and it will be evident that the force with which the upper is pulled accordingly depends upon the force with which it is gripped by the action of the fluid-pressure means, as determined by the force of the valve-controlling spring 274. In the course of the upper-pulling operation the toe wipers 16 are advanced and closed about the toe and are swung upwardly to wipe the upper heightwise of the last. As illustrated in Fig. 10, the wipers are thus moved upwardly to the proper positions for wiping the margin of the upper inwardly over the feather of the insole, and if the grippers are not moved far enough upwardly by the action of the spring 190 to make way for the wipers, the latter engage the grippers and further raise them to the proper positions, as permitted by the cam 188. Substantially at the time when the wipers thereafter begin their movements to wipe the upper inwardly over the insole the rise 320 on the cam 318 swings the latch 308 out from under the lower face of the block 304 to the dotted line position shown in Fig. 7, thus permitting the valve-controlling spring 274 to expand as much as permitted by engagement of the screw 322 with the latch. This serves to reduce the force with which the upper is gripped by the grippers to permit the upper to slip more freely between their jaws and thus to assist in avoiding any excessive strain thereon as the wipers wipe it inwardly. When the wipers have partially completed their inward wiping movements and have arrived in positions such as indicated, for example, in Figs. 12 and 13, the further rise 324 on the cam 318 swings the latch 308 out from under the screw 322 to release the block 304 and thus to permit the spring 274 to resume its initial condition. By reason of the resulting reduction of pressure of the fluid the grippers open and release the upper, as illustrated in Fig. 14 where the wipers are shown as substantially at the limits of their first overwiping movements. As hereinbefore suggested and as more fully disclosed in the previously mentioned Letters Patent, the machine comes automatically to a stop when the wipers are thus holding the upper in overwiped position to permit the operator to attach a binder wire to one side of the shoe and to draw it part way inwardly under the wipers around the toe, after which the operator again starts the machine by depression of the treadle. The wipers are then partially retracted and opened to permit the wire to be drawn more tightly inward against the margin of the upper and are again advanced and closed to force it firmly against the upper, whereupon the machine once more comes to a stop to permit the binder to be fastened at the other side of the shoe. In response to another depression of the treadle the machine completes its cycle of operations, the parts being returned to their starting positions. It will be evident that in response to such second and third depressions of the treadle the valve-controlling spring 274 is momentarily compressed and may thus cause the grippers to close, but these movements are idle movements since the upper is no longer between the gripper jaws. At these times, moreover, the latch 308 is held by the high portion of the cam 318 in such a position that the rod 292 is not held upraised by the latch but is permitted to return immediately to its initial position when released by the latch 298.

Having described the invention, what I claim as new and desire to secure by Letters Patent of the United States is:

1. In a machine for shaping uppers over lasts, upper-gripping means for gripping the margin of an upper on a last and for pulling the upper, fluid-operated means for closing said upper-gripping means on the upper, a pump for delivering operating fluid, means providing a constantly open passage for the fluid from the pump to said fluid-operated means, a valve arranged to be opened by the fluid delivered by said pump and to permit normally such escape of the fluid as to prevent the development of sufficient fluid pressure to close the upper-gripping means on the upper, and means for causing such closure of the upper-gripping means by applying to said valve force tending to close it.

2. In a machine for shaping uppers over lasts, upper-gripping means for gripping the margin of an upper on a last and for pulling the upper, fluid-operated means for closing said upper-gripping means on the upper, a pump for delivering operating fluid, means providing a constantly open passage for the fluid from the pump to said fluid-operated means, means providing an outlet for the fluid delivered by said pump, a valve controlling said outlet and arranged to be opened by the fluid, a spring arranged to apply to said valve force tending to close it but normally offering insufficient resistance to the escape of the fluid to cause the development of such fluid pressure as to close the upper-gripping means on the upper, and means for causing such closure of the upper-gripping means by increasing the stress of said spring.

3. In a machine for shaping uppers over lasts, upper-gripping means for gripping the margin of an upper on a last and for pulling the upper, fluid-operated means for closing said upper-gripping means on the upper, a pump for normally circulating operating fluid, a valve in the fluid circuit arranged to open in the direction of the flow of the fluid, means providing communication between said fluid-operated means and the fluid circuit at a point in the circuit between the valve and the pump, a spring arranged to apply to said valve force tending to close it but normally offering insufficient resistance of the fluid to cause circulation of the fluid to cause the upper-gripping means to be closed on the upper by pressure developed between the valve and the pump, and means for causing such closure of the upper-gripping means by control of said spring.

4. In a machine for shaping uppers over lasts, upper-gripping means for gripping the margin of an upper on a last and for pulling the upper, fluid-operated means for closing said upper-gripping means on the upper, a reservoir for operating fluid, a pump for delivering fluid from said reservoir to said fluid-operated means, a by-pass for normally returning fluid from the pump to the reservoir without developing sufficient pressure to close the upper-gripping means on the upper, a valve in said by-pass arranged to open in the direction of the flow of the fluid, a spring for yieldingly opposing such opening of the valve, and means for causing the upper-gripping means to close on the upper by increasing the stress of said spring.

5. In a machine for shaping uppers over lasts, upper-gripping means for gripping the margin of an upper on a last and for pulling the upper, fluid-operated means for closing said upper-gripping means on the upper, a pump for delivering operating fluid to said fluid-operated means, a relief valve arranged to be opened by the fluid and permitting escape of excess fluid delivered by the pump, said relief valve determining by its resistance to escape of the fluid the force with which the upper is gripped by the upper-gripping means but offering initially such little resistance to escape of the fluid as to prevent the development of sufficient fluid pressure to close the upper-gripping means on the upper, and means for causing such closure of the upper-gripping means by increasing the resistance of the relief valve to escape of the fluid.

6. In a machine for shaping uppers over lasts, upper-gripping means for gripping the margin of an upper on a last and for pulling the upper, fluid-operated means for closing said upper-gripping means on the upper, a pump for delivering operating fluid to said fluid-operated means, a relief valve arranged to be opened by the fluid and permitting escape of excess fluid delivered by the pump, a spring controlling said relief valve and determining by its stress the force with which the upper is gripped by the upper-gripping means, said spring offering initially such little resistance to escape of the fluid as to prevent the development of sufficient fluid pressure to close the upper-gripping means on the upper, and means for causing such closure of the upper-gripping means by increasing the stress of said spring.

7. In a machine for shaping uppers over lasts, means for gripping the margin of an upper on a last, power-operated mechanism for effecting relative movement of said upper-gripping means and the last to pull the upper in the course of a cycle of automatic operations of the machine, a treadle movable by the operator, and mechanism for closing said upper-gripping means on the upper in response to movement of said treadle prior to the starting of the cycle of operations, said upper-gripping means being movable to release the upper in response to optional release of the treadle by the operator also prior to the starting of the cycle.

8. In a machine for shaping uppers over lasts, means for gripping the margin of an upper on a last, power-operated mechanism for effecting relative movement of said upper-gripping means and the last to pull the upper in the course of a cycle of automatic operations of the machine, a treadle movable by the operator, and power-operated mechanism for closing said upper-gripping means on the upper in response to movement of said treadle prior to the starting of the cycle of operations of the machine, said last-named power-operated mechanism being reversely movable to cause the upper-gripping means to release the upper in response to optional release of the treadle by the operator also prior to the starting of the cycle.

9. In a machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a pump for delivering operating fluid to said fluid-operated mechanism, a relief valve permitting escape of excess fluid delivered by the pump, said relief valve determining variably by its resistance to escape of the fluid the force with which the upper is gripped by the upper-gripping means but offering initially such little resistance to escape of the fluid as to prevent the development of sufficient fluid pressure to close the upper-gripping means on the upper, and means for causing such closure of the upper-gripping means by increasing the resistance of the relief valve to the escape of the fluid prior to the starting of the cycle of operations of the machine and for optionally thereafter causing the upper-gripping means to release the upper by decreasing said resistance also prior to the starting of the cycle.

10. In a machine for shaping uppers over lasts, means for gripping the margin of an upper on a last, power-operated mechanism for effecting relative movement of said upper-gripping means and the last to pull the upper in the course of a cycle of automatic operations of the machine, fluid-operated mechanism for closing said upper-gripping means on the upper, a pump for delivering operating fluid to said fluid-operated mechanism, a relief valve arranged to be opened by the fluid and permitting escape of excess fluid delivered by the pump, a spring controlling said relief valve and determining by its stress the force with which the upper is gripped by the upper-gripping means, said spring offering initially such little resistance to escape of the fluid as to prevent the development of sufficient fluid pressure to close the upper-gripping means on the upper, and a member movable by the operator to increase the stress of said spring and thereby to cause the closure of the upper-gripping means prior to the starting of the cycle of operations of the machine, the spring being responsive to reverse movement of said member to decrease the resistance to escape of the fluid and thereby to permit the opening of the upper-gripping means also prior to the starting of the cycle.

11. In a machine for shaping uppers over lasts, means for gripping the margin of an upper on a last, power-operated mechanism for effecting relative movement of said upper-gripping means and the last to pull the upper in the course of a cycle of automatic operations of the machine, a member movable by the operator, mechanism for closing said upper-gripping means on the upper in response to movement of said member prior to the starting of the cycle of operations, and means for starting the cycle of operations by further movement of said member in the same direction beyond the position where it causes the closure of the upper-gripping means.

12. In a machine for shaping uppers over lasts, means for gripping the margin of an upper on a last, power-operated mechanism for effecting relative movement of said upper-gripping means and the last to pull the upper in the course of a cycle of automatic operations of the machine, a clutch through which the cycle of operations is performed, a member movable by the operator, mechanism for actuating the clutch to start the cycle of operations by movement of said member, means providing for lost motion between said member and the clutch-actuating means to permit a preliminary movement of the member prior to the actuation of the clutch, and mechanism for closing the upper-gripping means on the upper in response to said preliminary movement of the member.

13. In a machine for shaping uppers over lasts, means for gripping the margin of an upper on a last, power-operated mechanism for effecting relative movement of said upper-gripping means and the last to pull the upper in the course of a cycle of automatic operations of the machine, a clutch through which the cycle of operations is performed, a member movable by the operator, fluid-operated mechanism for closing the upper-gripping means on the upper in response to movement of said member prior to the starting of the cycle of operations, and means for actuating the clutch to start the cycle of operations by further movement of said member in the same direction beyond the position where it causes the closure of the upper-gripping means.

14. In a machine for shaping uppers over lasts, means for gripping the margin of an upper on a last, power-operated mechanism for effecting relative movement of said upper-gripping means and the last to pull the upper in the course of a cycle of automatic operations of the machine, fluid-operated means for closing said upper-gripping means on the upper, a pump for delivering operating fluid to said fluid-operated means, a relief valve arranged to be opened by the fluid and permitting escape of excess fluid delivered by the pump, said relief valve offering initially such little resistance to escape of the fluid as to prevent the development of sufficient fluid pressure to close the upper-gripping means on the upper, a member movable by the operator, means movable by said member to cause the closure of the upper-gripping means by increasing the resistance of the relief valve to escape of the fluid prior to the starting of the cycle of operations, and means for starting the cycle of operations by further movement of said member after the closure of the upper-gripping means.

15. In a machine for shaping uppers over lasts, means for gripping the margin of an upper on a last, power-operated mechanism for effecting relative movement of said upper-gripping means and the last to pull the upper in the course of a cycle of automatic operations of the machine, fluid-operated means for closing said upper-gripping means on the upper, a pump for delivering operating fluid to said fluid-operated means, a relief valve arranged to be opened by the fluid and permitting escape of excess fluid delivered by the pump, a spring controlling said relief valve and determining by its stress the force with which the upper is gripped by the upper-gripping means, said spring offering initially such little resistance to escape of the fluid as to prevent the development of sufficient fluid pressure to close the upper-gripping means on the upper, a member movable by the operator to cause the closure of the upper-gripping means by increasing the stress of said spring, and means for starting the cycle of operations also by movement of said member.

16. In a machine for shaping uppers over lasts, means for gripping the margin of an upper on a last, power-operated mechanism for effecting relative movement of said upper-gripping means and the last to pull the upper in the course of a cycle of automatic operations of the machine, a member movable by the operator, mechanism for closing said upper-gripping means on the upper in response to movement of said member and for optionally thereafter causing the upper-gripping means to release the upper in response to release of said member by the operator prior to the starting of the cycle of operations, and means for starting the cycle of operations by further movement of said member after the closure of the upper-gripping means.

17. In a machine for shaping uppers over lasts, means for gripping the margin of an upper on a last, power-operated mechanism for effecting relative movement of said upper-gripping means and the last to pull the upper in the course of a cycle of automatic operations of the machine, a clutch through which the cycle of operations is performed, a member movable by the operator, mechanism for actuating the clutch to start the cycle of operations by movement of said member, means providing for lost motion between said member and the clutch-actuating means to permit a preliminary movement of the member prior to the actuation of the clutch, and mechanism for closing the upper-gripping means on the upper in response to said preliminary movement of the member and for optionally also causing the upper-gripping means to release the upper upon reverse movement of the member prior to the starting of the cycle of operations.

18. In a machine for shaping uppers over lasts, upper-gripping means for gripping the margin of an upper on a last and for pulling the upper, power-operated mechanism for closing said upper-gripping means on the upper, a member movable by the operator, controlling mechanism movable by said member to render the power-operated mechanism thus operative and reversely movable also in response to release of said member by the operator to cause the release of the upper by the upper-gripping means, and a device for locking said controlling mechanism against such reverse movement in response to its movement beyond a predetermined position to maintain the grip on the upper regardless of release of said member.

19. In a machine for shaping uppers over lasts, upper-gripping means for gripping the margin of an upper on a last and for pulling the upper, fluid-operated mechanism for closing said upper-gripping means on the upper, a treadle movable by the operator, controlling mechanism movable by said treadle to render the fluid-operated mechanism thus operative and reversely movable also in response to release of the treadle by the operator to cause the release of the upper by the upper-gripping means, and a device for locking said controlling mechanism against such reverse movement in response to its movement by the treadle beyond a predetermined position to maintain the grip on the upper regardless of release of the treadle.

20. In a machine for shaping uppers over lasts, upper-gripping means for gripping the margin of an upper on a last and for pulling the upper, fluid-operated means for closing said upper-gripping means on the upper, a pump for delivering operating fluid to said fluid-operated means, a relief valve arranged to be opened by the fluid and permitting escape of excess fluid delivered by the pump, a spring controlling said relief valve but offering initially such little resistance to escape of the fluid as to prevent the development of sufficient fluid pressure to close the upper-gripping means on the upper, controlling mechanism movable by the operator to cause such closure of the upper-gripping means by increasing the stress of said spring and reversely movable also at the will of the operator to cause the release of the upper by the upper-gripping means, and a device for locking said controlling mechanism against such reverse movement in response to its movement by the operator beyond a predetermined position.

21. In a machine for shaping uppers over lasts, means for gripping the margin of an upper on a last, power-operated mechanism for effecting relative movement of said upper-gripping means and the last to pull the upper in the course of a cycle of automatic operations of the machine, a member movable by the operator, controlling mechanism movable by said member to cause the upper-gripping means to grip the upper and reversely movable at the will of the operator to cause the release of the upper by the upper-gripping means, means for starting the cycle of operations by further movement of said member after the gripping of the upper, and a device for locking said controlling mechanism against reverse movement in response to such further movement of said member.

22. In a machine for shaping uppers over lasts, means for gripping the margin of an upper on a last, power-operated mechanism for effecting relative movement of said upper-gripping means and the last to pull the upper in the course of a cycle of automatic operations of the machine, fluid-operated means for closing the upper-gripping means on the upper, a member movable by the operator, controlling mechanism movable by said member to render the fluid-operated means thus operative and reversely movable in response to release of said member by the operator to cause the release of the upper by the upper-gripping means, means for starting the cycle of operations by further movement of said member after the gripping of the upper, and a device for locking said controlling mechanism against reverse movement in response to such further movement of said member.

23. In a machine for shaping uppers over lasts, means for gripping the margin of an upper on a last, power-operated mechanism for effecting relative movement of said upper-gripping means and the last to pull the upper in the course of a cycle of automatic operations of the machine, fluid-operated means for closing the upper-gripping means on the upper, a pump for delivering operating fluid to said fluid-operated means, a relief valve arranged to be opened by the fluid and permitting escape of excess fluid delivered by the pump, a spring controlling said relief valve but offering initially such little resistance to escape of the fluid as to prevent the development of sufficient fluid pressure to close the upper-gripping means on the upper, a member movable by the operator, controlling mechanism movable by said member to cause the closure of the upper-gripping means by increasing the stress of said spring and reversely movable in response to release of said member by the operator to cause the release of the upper by the upper-gripping means, means for starting the cycle of operations by further movement of said member after the gripping of the upper, and a device for locking said controlling mechanism against reverse movement in response to such further movement of said member.

24. In a machine for shaping uppers over lasts, means for gripping the margin of an upper on a last, power-operated mechanism for effecting relative movement of said upper-gripping means and the last to pull the upper in the course of the operation of the machine, fluid-operated means for closing the upper-gripping means on the upper, and automatic means for changing the force with which the upper is gripped by the upper-gripping means by control of the operating fluid at a predetermined time in the operation of the machine while still maintaining the grip on the upper.

25. In a machine for shaping uppers over lasts, means for gripping the margin of an upper on a last, power-operated mechanism for effecting relative movement of said upper-gripping means and the last to pull the upper in the course of the operation of the machine, fluid-operated means for closing the upper-gripping means on the upper, a valve for determining the force with which the upper is gripped by the upper-gripping means by control of the operating fluid, and automatic means for changing the force with which the upper is thus gripped by control of said valve at a predetermined time in the operation of the machine while still maintaining the grip on the upper.

26. In a machine for shaping uppers over lasts, means for gripping the margin of an upper on a last, power-operated mechanism for effecting relative movement of said upper-gripping means and the last to pull the upper in the course of the operation of the machine, fluid-operated means for closing the upper-gripping means on the upper, a pump for delivering operating fluid to said fluid-operated means, a relief valve permitting escape of excess fluid delivered by the pump and determining by its resistance to the escape of the fluid the force with which the upper is gripped by the upper-gripping means, and automatic means for changing the force with which the upper is thus gripped by control of said valve at a predetermined time in the operation of the machine while still maintaining the grip on the upper.

27. In a machine for shaping uppers over lasts, means for gripping the margin of an upper on a last, power-operated mechanism for effecting relative movement of said upper-gripping means and the last to pull the upper in the course of a cycle of automatic operations of the machine, fluid-operated means for closing the upper-gripping means on the upper, a pump for delivering operating fluid to said fluid-operated means, a relief valve arranged to be opened by the fluid and permitting escape of excess fluid delivered by the pump, a spring controlling said relief valve and determining by its stress the force with which the upper is gripped by the upper-gripping means, and automatic means for changing the force with which the upper is thus gripped by altering the stress of said spring at a predetermined time in the cycle of operations while still maintaining the grip on the upper.

28. In a machine for shaping uppers over lasts, means for gripping the margin of an upper on a last, power-operated mechanism for effecting relative movement of said upper-gripping means and the last to pull the upper in the course of the operation of the machine, fluid-operated means for closing the upper-gripping means on the upper, and automatic means for reducing the force with which the upper is gripped by the upper-gripping means by reducing the pressure of the operating fluid at a predetermined time in the operation of the machine while still maintaining the grip on the upper and for thereafter further reducing the pressure of the fluid to cause the upper-gripping means to release the upper.

29. In a machine for shaping uppers over lasts, means for gripping the margin of an upper on a last, power-operated mechanism for effecting relative movement of said upper-gripping means and the last to pull the upper in the course of the operation of the machine, fluid-operated means for closing the upper-gripping means on the upper, a valve for determining the force with which the upper is gripped by the upper-gripping means by control of the pressure of the operating fluid, and automatic means for reducing the force of the grip on the upper by control of said valve at a predetermined time in the operation of the machine while still maintaining the grip on the upper and for thereafter by further control of said valve causing the upper-gripping means to release the upper.

30. In a machine for shaping uppers over lasts, means for gripping the margin of an upper on a last, power-operated mechanism for effecting relative movement of said upper-gripping means and the last to pull the upper in the course of the operation of the machine, fluid-operated means for closing the upper-gripping means on the upper, a pump for delivering operating fluid to said fluid-operated means, a relief valve permitting escape of excess fluid delivered by the pump and determining by its resistance to the escape of the fluid the force with which the upper is gripped by the upper-gripping means, and automatic means for reducing said resistance at a predetermined time in the operation of the machine to reduce the force of the grip on the upper while still maintaining the grip thereon and for thereafter further reducing said resistance to cause the upper-gripping means to release the upper.

31. In a machine for shaping uppers over lasts, means for gripping the margin of an upper on a last, power-operated mechanism for effecting relative movement of said upper-gripping means and the last to pull the upper in the course of a cycle of automatic operations of the machine, overlaying means for laying the marginal portion of the upper inwardly over an insole on the last also in the course of the cycle of operations, fluid-operated means for closing the upper-gripping means on the upper, and automatic means for reducing the force with which the upper is gripped by the upper-gripping means by control of the operating fluid substantially at the beginning of the overlaying movement of said overlaying means while still maintaining the grip on the upper.

32. In a machine for shaping uppers over lasts, means for gripping the margin of an upper on a last, power-operated mechanism for effecting relative movement of said upper-gripping means and the last to pull the upper in the course of a cycle of automatic operations of the machine, overlaying means for laying the marginal portion of the upper inwardly over an insole on the last also in the course of the cycle of operations, fluid-operated means for closing the upper-gripping means on the upper, a pump for delivering operating fluid to said fluid-operated means, a relief valve permitting escape of excess fluid delivered by the pump and determining by its resistance to the escape of the fluid the force with which the upper is gripped by the upper-gripping means, and automatic means for reducing the force with which the upper is thus gripped by reducing the resistance of said valve to the escape of the fluid substantially at the beginning of the overlaying movement of said overlaying means while still maintaining the grip on the upper.

33. In a machine for shaping uppers over lasts, grippers for gripping the margin of an upper about the toe end of a last, power-operated mechanism for effecting relative movement of said grippers and the last to pull the upper in the course of a cycle of automatic operations of the machine, wipers arranged to embrace the toe end of the upper and movable to wipe its marginal portion inwardly over an insole on the last also in the course of the cycle of operations, and automatic means for reducing the force with which the upper is gripped by said grippers substantially at the beginning of the movements of the wipers to wipe the upper inwardly over the insole while still maintaining the grip on the upper.

34. In a machine for shaping uppers over lasts, grippers for gripping the margin of an upper about the toe end of a last, power-operated mechanism for effecting relative movement of said grippers and the last to pull the upper in the course of a cycle of automatic operations of the machine, wipers arranged to embrace the toe end of the upper and movable to wipe its marginal portion inwardly over an insole on the last also in the course of the cycle of operations, fluid-operated means for closing said grippers on the upper, a pump for delivering operating fluid to said fluid-operated means, a relief valve permitting escape of excess fluid delivered by the pump and determining by its resistance to the escape of the fluid the force with which the upper is gripped by the grippers, and automatic means for reducing the force with which the upper is thus gripped by reducing the resistance of said valve to the escape of the fluid substantially at the beginning of the movements of the wipers to wipe the upper inwardly over the insole while still maintaining the grip on the upper.

35. In a machine for shaping uppers over lasts, grippers for gripping the margin of an upper about the toe end of a last, power-operated mechanism for effecting relative movement of said grippers and the last to pull the upper in the course of a cycle of automatic operations of the machine, said grippers being so formed as to permit them to slip on the upper in response to its resistance to the force of the pull thereon, wipers arranged to embrace the toe end of the upper and movable to wipe its marginal portion inwardly over an insole on the last also in the course of the cycle of operations, and automatic means for reducing the force with which the upper is gripped by said grippers after they have pulled the upper to permit them to slip more freely on the upper as the wipers wipe its marginal portion inwardly over the insole.

36. In a machine for shaping uppers over lasts, grippers for gripping the margin of an upper about the toe end of a last, power-operated mechanism for effecting relative movement of said grippers and the last to pull the upper in the course of a cycle of automatic operations of the machine, said grippers being so formed as to permit them to slip on the upper in response to its resistance to the force of the pull thereon, wipers arranged to embrace the toe end of the upper and movable to wipe its marginal portion inwardly over an insole on the last also in the course of the cycle of operations, fluid-operated means for closing the grippers on the upper, a valve for determining the force with which the upper is gripped by the grippers by control of the pressure of the operating fluid, and automatic means for reducing the force with which the upper is thus gripped by control of said valve after the grippers have pulled the upper to permit them to slip more freely on the upper as its marginal portion is wiped inwardly by the wipers.

37. In a machine for shaping uppers over lasts, grippers for gripping the margin of an upper about the toe end of a last, power-operated mechanism for effecting relative movement of said grippers and the last to pull the upper in the course of a cycle of automatic operations of the machine, said grippers being so formed as to permit them to slip on the upper in response to its resistance to the force of the pull thereon, wipers arranged to embrace the toe end of the upper and movable to wipe its marginal portion inwardly over an insole on the last also in the course of the cycle of operations, fluid-operated means for closing the grippers on the upper, a pump for delivering operating fluid to said fluid-operated means, a relief valve permitting escape of excess fluid delivered by the pump and determining by its resistance to the escape of the fluid the force with which the upper is gripped by the grippers, and automatic means for reducing the force with which the upper is thus gripped by reducing the resistance of said valve to the escape of the fluid after the grippers have pulled the upper to permit them to slip more freely on the upper as its marginal portion is wiped inwardly by the wipers.

BERNHARDT JORGENSEN.